(12) United States Patent
Thiele et al.

(10) Patent No.: US 9,944,398 B2
(45) Date of Patent: Apr. 17, 2018

(54) AIRCRAFT SUPPLEMENTARY COOLING SYSTEM BY EVAPORATING LIQUID NITROGEN

(71) Applicant: Airbus Defence and Space GmbH, Ottobrunn (DE)

(72) Inventors: Christian Thiele, Garching (DE); Emil Cernko, Reichertshausen (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 50 days.

(21) Appl. No.: 15/035,716

(22) PCT Filed: Nov. 10, 2014

(86) PCT No.: PCT/EP2014/003004
§ 371 (c)(1),
(2) Date: May 10, 2016

(87) PCT Pub. No.: WO2015/067373
PCT Pub. Date: May 14, 2015

(65) Prior Publication Data
US 2016/0257411 A1    Sep. 8, 2016

(30) Foreign Application Priority Data

Nov. 11, 2013 (EP) .................................... 13005295

(51) Int. Cl.
*B64D 13/08* (2006.01)
*F25D 3/10* (2006.01)
(Continued)

(52) U.S. Cl.
CPC ............... *B64D 13/08* (2013.01); *F25D 3/10* (2013.01); *B64D 2013/064* (2013.01);
(Continued)

(58) Field of Classification Search
CPC ........ B64D 13/08; B64D 11/04; B64D 13/06; B64D 2013/0674; B64D 2013/0614;
(Continued)

(56) References Cited

U.S. PATENT DOCUMENTS 3,803,859 A * 4/1974 Kleffmann ................ B60P 3/20
62/52.1
5,287,705 A * 2/1994 Roehrich ............. B60H 1/3202
62/217
(Continued)

FOREIGN PATENT DOCUMENTS

DE    102007015390 A1    10/2008
DE    102011014565 A1    9/2012
(Continued)

OTHER PUBLICATIONS

Translation of FR 2094593 of Bertin & Cie.*
(Continued)

*Primary Examiner* — Mohammad M Ali
(74) *Attorney, Agent, or Firm* — Lorenz & Kopf, LLP

(57) ABSTRACT

A cooling system for an interior space of a vehicle comprises a main cooling system coupled with an air inlet for receiving air and coupled with the interior space for providing cooled air to the interior space, at least one air duct arranged between the air inlet and the interior space, a reservoir for liquid nitrogen having a nitrogen outlet and a valve arranged between the outlet and an injection port of the at least one air duct. The reservoir is couplable with the injection port of the at least one air duct via the valve on demand for evaporating nitrogen in the at least one air duct. With the injection of liquid nitrogen the main cooling system is supported in case it is not able to provide a sufficient cooling power.

16 Claims, 1 Drawing Sheet

(51) Int. Cl.
    *B64D 13/06* (2006.01)
    *F24F 5/00* (2006.01)
(52) U.S. Cl.
    CPC ............... *B64D 2013/0614* (2013.01); *B64D 2013/0629* (2013.01); *B64D 2013/0674* (2013.01); *F24F 2005/0039* (2013.01); *Y02T 50/56* (2013.01)
(58) Field of Classification Search
    CPC ...... B64D 2013/064; B64D 2013/0629; F25D 3/10; Y02T 50/56; Y02T 50/5046; Y02T 50/5044; F24F 2005/0039
    USPC ........................................................ 62/52.1
    See application file for complete search history.

(56) References Cited

U.S. PATENT DOCUMENTS

| | | | | | |
|---|---|---|---|---|---|
| 5,365,744 | A | * | 11/1994 | Viegas | B60H 1/00007 62/239 |
| 5,415,001 | A | * | 5/1995 | Powars | F17C 9/00 62/47.1 |
| 6,094,924 | A | * | 8/2000 | Viard | A23L 3/375 62/186 |
| 6,389,828 | B1 | * | 5/2002 | Thomas | B29C 47/0016 264/237 |
| 2004/0159119 | A1 | * | 8/2004 | Hu | B64D 13/00 62/435 |
| 2010/0071387 | A1 | * | 3/2010 | Gross | B28C 7/0038 62/62 |
| 2012/0240599 | A1 | * | 9/2012 | Stolte | B64D 13/08 62/45.1 |

FOREIGN PATENT DOCUMENTS

FR    2094593  A5   12/1979
GB    2022230  A    11/1994

OTHER PUBLICATIONS

International Searching Authority, International Search Report for International Patent Application PCT/EP2014/003004 dated Jan. 14, 2015.

* cited by examiner

AIRCRAFT SUPPLEMENTARY COOLING SYSTEM BY EVAPORATING LIQUID NITROGEN

CROSS-REFERENCE TO RELATED APPLICATIONS

This is a continuation of International Application No. PCT/EP2014/003004, filed Nov. 10, 2014, which application claims priority to European Application No. 13005295.4, filed Nov. 11, 2013, which are hereby incorporated by reference in their entirety.

TECHNICAL FIELD

The embodiments described herein relate to a cooling system for an interior space of a vehicle, a vehicle with at least one interior space, and a cooling system, as well as to a method for cooling an interior space of a vehicle.

BACKGROUND

In addition, other objects, desirable features and characteristics will become apparent from the subsequent summary and detailed description, and the appended claims, taken in conjunction with the accompanying drawings and this background.

In current aircraft, environmental control systems (ECS) and cooling systems are mainly based on a setup that ensures coping with a maximum heat load over a complete flight envelope and on the ground. Also, transient conditions are usually taken into consideration, resulting in ECS, which tend to have an excessive power reserve and an excessive power consumption. Also, expanding an originally defined flight envelope and/or the operational range or simply meeting the need of additional cooling capabilities require a complete redesign of the basic environmental control system.

In aircraft applications, especially for cooling electronic devices, supplemental cooling systems are known, which make use of cooling agents that are distributed through dedicated cooling circuits. In an alternative, the electronic devices may comprise cooling fins, which are impinged by a flow of a cooled gas.

It is also known to equip heat generating components, especially electronics devices, with power-consuming heat transfer devices like Peltier elements or heat pipes, which still have to dissipate the heat load to ambient air, e.g. through fins mounted on the hot side of the heat transfer devices. However, the ambient air temperature around the vehicle, especially an aircraft, may sometimes rise up to 71° C. on hot days on the ground, which may complicate a sufficient heat transfer.

DE 10 2011 014 565 A1 discloses an air conditioning system for an aircraft having a main cooling system for providing cooled air into a cabin of the aircraft and a cryogenic reservoir for holding a cryogenic fluid, wherein the cooling system is adapted for cooling air through heating of the cryogenic fluid.

SUMMARY

It is an object of the embodiment to propose a cooling system for cooling an interior space of a vehicle, which is easily expandable or retrofittable, especially for dealing with transient conditions or variable operating parameters throughout a vehicle type.

A cooling system for an interior space of a vehicle is proposed. The cooling system comprises a main cooling system coupled with an air inlet for receiving air and coupled with the interior space for providing cooled air to the interior space, at least one air duct arranged between the air inlet and the interior space, a reservoir for liquid nitrogen having a nitrogen outlet, and a valve arranged between an outlet of the reservoir and an injection port of the at least one air duct. The reservoir for liquid nitrogen is couplable with the injection port of the at least one air duct via the valve on demand for injecting and evaporating nitrogen in the at least one air duct.

The gist of the embodiments therefore lie in combining a common cooling system for an interior space of a vehicle, which is able to provide an adequate cooling and ventilation of the at least one interior space in the majority of occurring conditions, with a simple and retrofittable supplementary cooling system. The main cooling system thereby is designed for handling all cooling demands for a reference mission profile, which primarily depends on the ambient conditions that include the ambient temperature, ambient pressure, and in some cases, the deliverable flow rate of ambient air, depending on the type of main cooling system. For example, the reference mission profile may include an upper limit for the ambient temperature of an ISA standard day plus 12° C.

Basically, the main cooling system is adapted for providing a flow of cooled air, which is to be introduced into the interior space. Consequently, the main cooling system comprises an air inlet for receiving air and an outlet for providing cooled air to the interior space. From the outlet, the interior space may be supplied with cooled air through a single duct or an air distribution system having a plurality of ducts downstream the outlet.

The main cooling system may be realized in a large number of different types, which are mentioned further below. Besides passive cooling systems, that merely provide ambient air to the interior space, active systems are conceivable, which actively lower the temperature of the incoming air flow under consumption of power.

If the vehicle leaves a predetermined mission profile, such that the ambient temperature is above a maximum design case, the air flow entering the air inlet of the main cooling system exceeds the design temperature range. Consequently, the main cooling system is not able to provide sufficiently cooled air and required supplemental cooling. This is achieved by providing a flow of liquid nitrogen from a reservoir into an injection port of the at least one air duct, such that it evaporates and thereby mixes with the air flowing through the respective air duct and lowers its temperature.

The nitrogen reservoir is adapted for storing a sufficient amount of liquid nitrogen having a temperature of approximately −196° C., which may be accomplished through an isolated tank. For increasing the ease of implementation, the nitrogen reservoir should be easily removable or equipped with a refill port easily accessible from an outside of the vehicle.

The interior space of the vehicle may preferably be a space that contains heat generating devices. For example, these devices may include avionics and accessories, such as actuators, hydraulic machines, generators or other devices. Providing a sufficient cooling prevents damage to electronic devices, which usually require a maximum core temperature e.g. between 90° C. and 100° C., which must not be exceed. If mechanical devices are installed in the respective interior space, a sufficient cooling function ensures a constant quality of lubricants and prevents structural overheat.

A great advantage of the cooling system according to the embodiment is its flexibility and the ease of integration, since through installing the reservoir, the respective valve and auxiliary components, it may simply be retrofitted into existing vehicles. The supplemental cooling function is completely independent from a main cooling system, but supports its function and is furthermore easily adaptable to the actual cooling requirement of the respective vehicle. If the vehicle is an aircraft, the cooling system provides sufficient cooling during the complete flight envelope and on ground with an especially low power demand, which may be limited to a fan for providing ambient air into the air inlet in case the aircraft is on ground. The technology of storing liquid nitrogen is well known, and all parts contributing to the supplementary cooling function have very good reliability. Also, these parts may be rather compact, depending on the size of the reservoir, such that parts of the cooling system according to the embodiment may be realized as easily detachable and reattachable modules, which may be carried on board on demand.

In an advantageous embodiment, the injection port comprises an injection nozzle, which is connectable to the nitrogen reservoir unit by means of the valve. On demand, the valve may be opened, such that liquid nitrogen is flowing to the nozzle in order to be sprayed into the injection port of the main cooling system. After being injected into the air flow in the at least one duct, the liquid nitrogen evaporates and thereby decreases the temperature. Through spraying nitrogen, a faster and even evaporation is accomplished.

In a still further advantageous embodiment, the valve is adapted for adjusting a flow rate delivered to the inlet. This may be accomplished by a flow control valve, which may be triggered through an appropriate digital or analog signal. This signal may be provided by a control unit, which may be a dedicated supplemental cooling control unit or may be integrated into a control unit of the main cooling system. If an increased cooling requirement is determined, the control unit may trigger the valve to let nitrogen flow to the injecting port of the at least one air duct. Depending on the required additional cooling capacity, the valve may limit the flow rate in an appropriate manner. If the valve could not be adapted as for example for a simple shutoff valve, the flow rate could be adjusted by modifying the injection port nozzle length and diameter.

Still further, the air inlet may comprise a first control means, which is adapted for sensing a temperature at the air inlet and for inducing an injection of liquid nitrogen into the injection port if a predetermined maximum temperature at the air inlet is exceeded. For example, the first control means comprises a first temperature sensor for acquiring the temperature of the incoming airflow, wherein a signal representing the acquired temperature of the incoming airflow is delivered to a control unit, which is adapted to initiate a flow of nitrogen to the inlet if a predetermined maximum temperature is exceeded. This ensures that the incoming airflow always falls in the design range of the main cooling system, such that the required cooling capacity for the interior space can be met. The predetermined maximum temperature may for example be the ISA standard day temperature plus 17° C. Hence, if the vehicle experiences a rather high ambient temperature, which would lead to an insufficient cooling capacity for the interior space, the supplemental cooling system supports the main cooling system. The first control means may be located directly in the air inlet or downstream, as long as the temperature of the incoming flow of air can be measured.

Also, the cooling system may comprise at least one second control means, which is adapted for sensing a temperature in the interior space and for inducing an injection of liquid nitrogen into the injection port if a predetermined maximum temperature in the interior space is exceeded. In analogy to the first control means, the second control means may comprise a second temperature sensor, which is installed in the interior space of the vehicle, which second temperature sensor is adapted for transferring a signal representing the temperature in the interior space to a control unit. In case a heat load in the interior space is generated, which heat load leads to an excess temperature in the interior space, independent from the temperature of the inflowing air, the supplemental cooling function may be initiated. For example, the interior space may comprise electronic devices, such as in an avionics bay in an aircraft. Sensing the temperature in the interior space supports preventing an over-temperature in the interior space even if the ambient conditions of the vehicle are in the operating range. The second control means may be located directly in the interior space or in an outflow opening, through which air exits the respective interior space having a temperature representative for the temperature in the interior space.

The control unit is not necessarily a separate component. It also may be a device that shares the same housing or circuit board with the temperature sensor, hence, both constitute an integral unit. Also, the control unit is not necessarily an electronic device, it may also be a simple switch or relays, which may be triggered by a bi-metal instrument.

In an advantageous embodiment, the cooling system comprises a ram air inlet and a main duct for routing ram air to the at least one interior space. The air inlet mentioned above may provide the function of receiving ram air. Also, a separate ram air inlet may be used. The design of a main cooling system constituted by a ram air inlet and a main air duct is extremely simple and may be sufficient for an air-based cooling of small passenger compartments in passenger aircraft or electronics compartments in unmanned aerial vehicles. Through the design of the main air duct and duct branches connected thereto, a flow rate into the interior space may be adjusted based on a target velocity of the vehicle. However, on ground or at stand still, an additional fan arranged in the main duct or downstream of the ram air inlet supports the airflow into the main duct. By simply injecting nitrogen into the main duct, the temperature of the gas flowing into the interior space can be lowered.

In a still further advantageous embodiment, the main cooling system may be an evaporative cooling system, which may comprise at least one heat exchanger arranged in an air inlet of the main cooling system. Through this heat exchanger, the heat emanating from the evaporation process is disposed of Depending on the ambient temperature, the amount of heat, which is disposed of, may vary. As the total cooling capacity of the main cooling system depends on this temperature, the supplemental cooling system may decrease the temperature of the air flowing through this heat exchanger, such that the required cooling capacity can finally be achieved.

In analogy to this, the main cooling system may be based on an air cycle method, which also depends on a heat exchanger for disposing of heat created during the air cycle process. By injecting liquid nitrogen and evaporating it in the air flowing to this heat exchanger, the cooling capacity can be adjusted.

Furthermore, the cooling system according to the embodiment may comprise a third control means, which is adapted for sensing an operating state of the vehicle and for inducing an injection of liquid nitrogen into the injection port if a given operating state is present. For example, if the main cooling system is based on a ram air induced cooling, a sufficient ram air flow cannot be achieved at standstill of the vehicle. Even if the sensed temperatures at the air inlet and/or in the interior space may temporarily be in a defined operating range, the cooling system may induce the injection of nitrogen in order to maintain these temperatures. Also, the operation of a fan may be initiated at the same time, for ensuring a sufficient air flow.

The embodiments further relate to a method for cooling an interior space of a vehicle, basically comprising the steps of receiving air from an air inlet, cooling the air through a main cooling system, directing the cooled air to the interior space and injecting liquid nitrogen into at least one air duct between the air inlet and the interior space.

The method may also comprise the step of sensing at least one temperature in the vehicle and initiating the injection of liquid nitrogen into the at least one air duct. The sensing may be conducted in the at least one air duct, in the air inlet and/or in the interior space.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
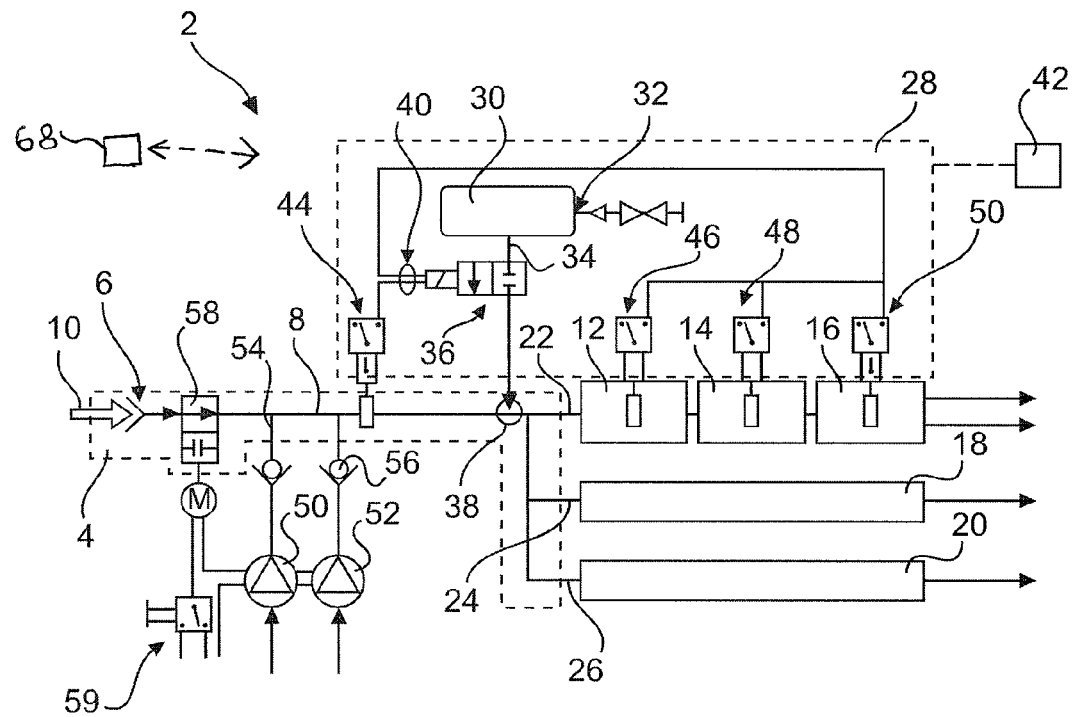
FIG. 1 shows a first embodiment of the cooling system in a schematic, block-oriented view.

FIG. 1 shows a general setup of the cooling system 2 according to an embodiment. A main cooling system 4 comprises an air inlet 6 and a main duct 8, which routes air 10 from the air intake 6 to various interior spaces 12, 14, 16, 18 and 20 of the vehicle. From the main duct 8, several ducts 22, 24 and 26 branch off and constitute an air distribution system. This type of main cooling system 4 is the most simple cooling system, which only requires a sufficient flow of air, which ventilates and thereby cools the interior spaces 12 to 20 and the components installed therein, respectively. Used air exits the respective interior spaces 12 to 20, as indicated by arrows.

The cooling capacity of the main cooling system 4 depends on a number of parameters. If the interior spaces 12 to 20 contain heat generating components, such as in avionics bays, heat needs to be extracted from these components. In an air-based cooling process, usually heat exchangers in the form of plate-shaped members with a number of cooling fins extending into the airflow are used, which are thermally coupled to electronic or other devices that are responsible for the heat generation. Based on a given maximum core temperature for these components, the required cooling power is determined. For at least maintaining this maximum core temperature, a minimum temperature difference between the heat exchanger and the air flowing into the interior spaces 12 to 20 at a given flow rate is determined. Consequently, the cooling capacity of the main cooling system 4 may either be increased by increasing the flow rate of the ram air flow 10 or the temperature difference mentioned above. However, the flow rate of the ram air flow 10 can hardly be increased. Furthermore, when the vehicle is an aircraft, air flowing into the intake 6 on the ground may only be generated by at least one fan 50 and 52, which needs to be integrated into the ram air duct or a region close thereto, such that the dimensions of the fan(s) and therefore the available power are also limited. Still further, the ambient temperature on ground may clearly exceed the maximum air temperatures in flight.

To provide an additional cooling function, a supplementary cooling system 28 is proposed. A main component of the supplementary cooling system 28 is a nitrogen reservoir 30, which is adapted for storing a predetermined amount of liquid nitrogen at approximately −196° C. The nitrogen reservoir 30 comprises a nitrogen inlet 32, which allows refilling of the nitrogen reservoir 30, as well as a nitrogen outlet 34, through which nitrogen can be tapped. A nitrogen shutoff valve 36 connects the outlet 34 of the nitrogen reservoir 30 with an injection port 38 of the main air duct 8.

The nitrogen shutoff valve 36 basically comprises two operation states, which include the isolation of the nitrogen reservoir 30 and a through-flow of nitrogen. The nitrogen shutoff valve 36 is controllable through control ports 40, which initiate a transition between the two operating states. By providing a signal or a voltage, the nitrogen shutoff valve 36 initiates a flow from the nitrogen outlet 34 to the injection port 38 or initiates the interruption of flow.

By injecting liquid nitrogen into the injection port 38 of the main air duct 8, nitrogen evaporates, which then mixes with the air in the main air duct 8 and clearly reduces the temperature of the mixed gas flowing to the interior spaces 12 to 20.

Hence, if the cooling capacity provided through the air intake 4 is not sufficient, nitrogen may simply be injected into the main air duct 8, which efficiently supports the cooling process.

The initiation of the supplementary cooling system 28 may be conducted through a control unit 42, which may connectable to the signal ports 40 of the nitrogen shutoff valve 36. The supplementary cooling system 28 may then be operated alternatingly or in a continuous manner.

Initiation of the supplementary cooling 28 system may be made depending on several conditions. For example, the cooling system 2 comprises a first control means 44, which is exemplarily realized as a temperature sensor switch. The first control means 44 is adapted for sensing a temperature upstream of the nitrogen injection port 38 and is connected to the signal ports 40 of the nitrogen shutoff valve 36. Hence, if a first temperature sensed by the first control means 44 exceeds a predetermined maximum, the nitrogen shutoff valve 36 is opened. For example, the predetermined temperature may be 32° C., which equals the ISA standard day temperature plus 17° C.

Still further, the interior spaces 12, 14 and 16 comprise second control means 46, 48 and 50, which are all connected to the inlet ports 40 and are all adapted for sensing a temperature in the interior spaces 12, 14 and 16 and for initiating the injection of nitrogen, if a predetermined maximum temperature is exceeded. For example, if the interior spaces 12, 14 and 16 comprise avionics racks, the temperatures therein may be measured, while supplementary cooling is activated e.g. when a temperature of 65° C. is a exceeded. Furthermore, the cooling system 2 may comprise a third control unit 68, which is adapted for sensing an operating state of the vehicle and for inducing an injection of liquid nitrogen into the injection port if a given operating state is present.

As mentioned above, it is necessary to provide an airflow into the main air duct 8 through fans 50 and 52, which are coupled with the main air duct 8 through associated non-return valves 54 and 56. If the vehicle is an aircraft, for example, the fans 50 and 52 may be coupled to a control unit, which delivers a signal, if the wheels of a landing gear touches the ground or the aircraft speed falls below a predefined limit or the aircraft attitude exceeds predefined limits as, for example, the angle of attack during landing. The fans 50 and 52 may exemplarily be integrated into a nose landing gear bay. If the fans 50 and 52 are operated, a ram air shutoff valve 58 directly downstream of the air inlet 6 may be closed, in order to not lead the fresh air from the fans 50 and 52 out of the air inlet 6 into the surrounding of the aircraft.

Also, the ram air shutoff valve 58 should be continuously monitored, such that an unintended closing state during flight may initiate the operation of the fans 50 and 52, which should be dimensioned to be able to supply sufficient air flow for the interior spaces 12-20 to allow a safe return flight. To exclude logical errors, e.g. in the control unit 42, the ram air shutoff valve 58 may be hard wired to a switch 59 of the fans 50 and 52. Further, the operation of the fans 50 and 52 may be initiated if the ram air shutoff valve 58 is not completely open or if a "Weight-on-Wheel" signal is present, or if an external power supply is attached to the aircraft.

Figure 2:
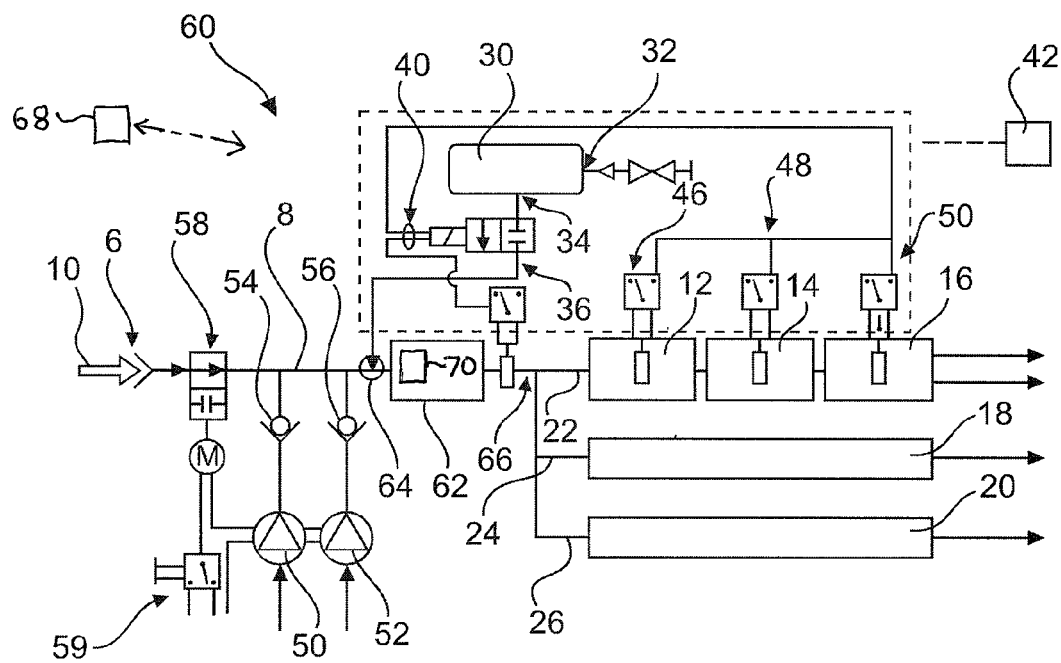
FIG. 2 shows a further embodiment of the cooling system in a schematic, block-oriented view.

FIG. 2 depicts another cooling system 60, which is based on an alternative cooling concept including active components. For the sake of simplicity, a main cooling system 62 is shown as a block, which is provided with air 10 from the air inlet 6 through the main air duct 8. The main cooling system 62 may be an evaporative cooling system or a cooling system based on an air cycle process. The main difference with the cooling system 2 shown in FIG. 1 is the fact that a nitrogen injection port 64 is positioned clearly upstream of the main cooling system 62 downstream of the air inlet 4. Here, either a heat exchanger 70, through which excessive heat is disposed of, or the incoming airflow are supplied with injected nitrogen. A first control means 66, which may equal the first control means 44 of FIG. 1, may be positioned downstream of the main cooling system 62. Hence, if the main cooling system does not provide a sufficiently cooled air flow, the first control means 66 may initiate the supplementary cooling function. Furthermore, the cooling system 60 may comprise a control unit 68, which is adapted for sensing an operating state of the vehicle and for inducing an injection of liquid nitrogen into the injection port if a given operating state is present.

Altogether, the cooling systems 2 and 60 have a clear advantage over known cooling systems, as they may easily be retrofitted through the addition of the supplementary cooling system and may easily be sized to the requirements of the actual vehicle.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A cooling system for an interior space of a vehicle, comprising:
   a main cooling system coupled to an air inlet for receiving air and coupled with the interior space for providing cooled air to an interior space;
   at least one air duct arranged between the air inlet and the interior space;
   a reservoir for liquid nitrogen having a nitrogen outlet; and
   a valve arranged between the nitrogen outlet of the reservoir and an injection port of the at least one air duct;
   wherein the main cooling system is an evaporative cooling system comprising at least one heat exchanger arranged in the air inlet or an air cycle cooling system;
   wherein the reservoir is couplable with the injection port of the at least one air duct via the valve on demand for evaporating nitrogen in the at least one air duct; and
   wherein the injection port is upstream of the main cooling system, and downstream of the air inlet.

2. The cooling system of claim 1, further comprising an injection nozzle having an injection port for spraying the nitrogen into air flowing through the at least one air duct.

3. The cooling system of claim 1 further comprising the valve is a flow control valve.

4. The cooling system of claim 1, further comprising:
   a first control unit adapted for sensing a temperature at the air inlet and for inducing an injection of liquid nitrogen into the injection port if a predetermined maximum temperature at the air inlet is exceeded.

5. The cooling system of claim 1, further comprising a second control unit, adapted for sensing a temperature in the interior space and for inducing an injection of liquid nitrogen into the injection port if a predetermined maximum temperature in the interior space is exceeded.

6. The cooling system of claim 4,
   wherein the first control unit comprises a temperature sensor; and
   a control unit is coupled to the temperature sensor.

7. The cooling system of claim 1, further comprising:
   a third control unit, which is adapted for sensing an operating state of the vehicle and for injecting liquid nitrogen into the injection port if a predetermined operating state is present.

8. The cooling system of claim 1, comprising:
   a ram air inlet; and
   a main air duct for routing ram air to the interior space.

9. The cooling system of claim 1, further comprising a second control unit, adapted for sensing a temperature in the interior space and for inducing an injection of liquid nitrogen into the injection port if a predetermined maximum temperature in the interior space is exceeded;

wherein the second control unit comprises a temperature sensor; and
a control unit coupled to the temperature sensor.

10. The cooling system of claim 1, further comprising:
a third control unit, which is adapted for sensing an operating state of the vehicle and for inducing injecting liquid nitrogen into the injection port if a predetermined operating state is present;
a ram air inlet; and
a main air duct for routing ram air to the interior space.

11. The cooling system of claim 1,
wherein the main cooling system is an evaporative cooling system, that comprises at least one heat exchanger in the air inlet; and
wherein the main cooling system is an air cycle cooling system.

12. A method for cooling an interior space of a vehicle, the method comprising:
receiving air from an air inlet,
cooling the air through a main cooling system in the form of an evaporative cooling system comprising at least one heat exchanger arranged in the air inlet or an air cycle cooling system,
directing the cooled air to the interior space; and
injecting liquid nitrogen into at least one air duct between the air inlet and the interior space upstream of the main cooling system and downstream of the air inlet on demand.

13. The method of claim 12, furthermore comprising:
sensing at least one temperature in the vehicle; and
initiating the injection of liquid nitrogen into the at least one air duct.

14. The method of claim 12, wherein the sensing may be conducted in at least one of the at least one air duct, the air inlet, and the interior space.

15. A cooling system for an interior space of a vehicle, comprising:
a main cooling system coupled to an air inlet for receiving air and coupled with the interior space for providing cooled air to an interior space,
at least one air duct arranged between the air inlet and the interior space;
a reservoir for liquid nitrogen having a nitrogen outlet; and
a valve arranged between the nitrogen outlet of the reservoir and an injection port of the at least one air duct;
wherein the main cooling system is an evaporative cooling system comprising at least one heat exchanger arranged in the air inlet or an air cycle cooling system;
wherein the reservoir is couplable with the injection port of the at least one air duct via the valve on demand for evaporating nitrogen in the at least one air duct, and
further comprising an injection nozzle having an injection port for spraying the nitrogen into air flowing through the at least one air duct;
wherein the injection port is upstream of the main cooling system and downstream of the air inlet.

16. The cooling system of claim 1 further comprising:
a flow control valve; and
a first control unit adapted for sensing a temperature at the air inlet and for inducing an injection of liquid nitrogen into the injection port if a predetermined maximum temperature at the air inlet is exceeded.

* * * * *